(12) United States Patent
Lancashire

(10) Patent No.: US 8,362,944 B2
(45) Date of Patent: Jan. 29, 2013

(54) RADAR SYSTEM

(75) Inventor: David Charles Lancashire, Emsworth (GB)

(73) Assignee: Astrium Limited, Stevenage, Hertfordshire (GB)

( * ) Notice: Subject to any disclaimer, the term of this patent is extended or adjusted under 35 U.S.C. 154(b) by 456 days.

(21) Appl. No.: 12/504,933

(22) Filed: Jul. 17, 2009

(65) Prior Publication Data

US 2010/0265123 A1    Oct. 21, 2010

(30) Foreign Application Priority Data

Apr. 21, 2009   (EP) .................................. 09275028

(51) Int. Cl.
*G01S 7/02*    (2006.01)
*G01S 7/28*    (2006.01)
*H01Q 3/30*   (2006.01)
*G01S 13/00*  (2006.01)
*H01Q 3/00*   (2006.01)

(52) U.S. Cl. ................ 342/81; 342/73; 342/74; 342/82; 342/89; 342/118; 342/134; 342/135; 342/175; 342/195; 342/368; 342/377

(58) Field of Classification Search ....... 342/25 R–25 F, 342/73–82, 89–103, 147, 158, 175, 195, 342/157, 368–377, 118, 128–145
See application file for complete search history.

(56) References Cited

U.S. PATENT DOCUMENTS

| | | | | | |
|---|---|---|---|---|---|
| 2,403,728 | A | * | 7/1946 | Loughren | 342/157 |
| 2,407,169 | A | * | 9/1946 | Loughren | 342/157 |
| 2,409,944 | A | * | 10/1946 | Loughren | 342/372 |
| 2,426,460 | A | * | 8/1947 | Lewis | 342/157 |
| 3,135,917 | A | * | 6/1964 | Best et al. | 342/375 |
| 3,213,453 | A | * | 10/1965 | Morrison, Jr. et al. | 342/378 |
| 3,251,062 | A | * | 5/1966 | Ghose | 342/371 |
| 3,487,408 | A | * | 12/1969 | Clarke | 342/158 |
| 3,517,389 | A | * | 6/1970 | Dausin | 342/371 |
| 3,906,502 | A | * | 9/1975 | Connolly | 342/372 |
| 4,052,723 | A | * | 10/1977 | Miller | 342/368 |
| 4,121,209 | A | * | 10/1978 | ap Rhys | 342/157 |
| 4,253,098 | A | * | 2/1981 | Blythe | 342/25 A |
| 4,291,310 | A | * | 9/1981 | Kruger | 342/81 |
| 4,864,312 | A | * | 9/1989 | Huignard et al. | 342/375 |

(Continued)

FOREIGN PATENT DOCUMENTS

DE    10 2006 022 814 A1    11/2007

OTHER PUBLICATIONS

European Search Report dated Jun. 30, 2009.

(Continued)

*Primary Examiner* — Bernarr Gregory
(74) *Attorney, Agent, or Firm* — Buchanan Ingersoll & Rooney P.C.

(57) ABSTRACT

A radar system is disclosed for forming a scanning receive beam from signals received by a phased array having a plurality of sub arrays. An exemplary radar system includes a plurality of phase units each configured to receive a signal from one or more sub arrays. Each phase unit includes a waveform generator configured to generate an analog waveform having a frequency corresponding to a time-varying phase shift. Each waveform generator is arranged to digitally generate the analog waveform, and output a comparison of the received signal with the waveform, incorporating the time-varying phase shift. The system further includes a combining unit configured to combine the outputs from the plurality of phase units to form a scanning receive beam.

20 Claims, 2 Drawing Sheets

U.S. PATENT DOCUMENTS

| | | | | |
|---|---|---|---|---|
| 5,351,053 A | * | 9/1994 | Wicks et al. | 342/158 |
| 5,680,141 A | * | 10/1997 | Didomenico et al. | 342/372 |
| 5,712,642 A | * | 1/1998 | Hulderman | 342/372 |
| 5,764,187 A | * | 6/1998 | Rudish et al. | 342/372 |
| 5,943,010 A | * | 8/1999 | Rudish et al. | 342/372 |
| 5,955,992 A | * | 9/1999 | Shattil | 342/375 |
| 2003/0142015 A1 | | 7/2003 | Boe et al. | |
| 2009/0109086 A1 | | 4/2009 | Krieger et al. | |

OTHER PUBLICATIONS

Adrian Garrod, "Digital Modules for Phased Array Radar", Phased Array Systems and Technology, IEEE International Symposium IUM, Oct. 15-18, 1996, pp. 81-86, XP-010204726.

Christoph Heer et al., "Front End Technology for Digital Beamforming SAR", IGARSS, 2008, 2 pages.

* cited by examiner

RADAR SYSTEM

FIELD

The present invention relates to a radar system receiving signals from a phased array antenna. In particular, the radar system controls a receive beam to scan over an area.

BACKGROUND

A known radar system has a wide beam transmit antenna to illuminate a wide area with a radar pulse. The signal is scattered by the ground, resulting in an echo signal being received by the radar system. The echoes from ground points closer to the radar system are received before those from ground points further from the radar system. Typically, the time delay between echoes from a near ground point and a far ground point will exceed the duration of the transmitted pulse. Thus, at any one point in time echoes are received from only part of the illuminated ground area. The radar echo can be received using a narrower antenna beam than required for transmission. The narrower beam is required to scan across the ground area with time, to track the motion of the source of the echo signal.

It is known to scan the receive beam using switched delay lines. A phased array antenna comprises a plurality of antenna sub arrays. Each of the antenna sub arrays forming the array has switched delay lines through which the radar signal is received. The switched delay lines introduce a delay, which can be selected between discrete values to scan the receive beam. However, switching the delay requires a finite amount of time, typically tens of nanoseconds. During switching, the received beam characteristics are indeterminate. In addition, the receive beam must be wide enough to ensure it always covers the instantaneous echo extent. A point on the ground will see a different point in the received beam gain pattern each time the beam scan switches. The switching point in the echo will be different for different ground locations. Thus, gain compensation over the pulse duration is difficult, degrading the impulse response function in a direction away from the radar system. It is also known to use a digital beam former which can separately receive and digitise the signals from each sub array of the array, for example from FRONT END TECHNOLOGY FOR DIGITAL BEAMFORMING SAR Christoph Heer, Christian Fischer, Christoph Schaefer IGARSS 2008. The digital beam former then digitally applies the required delay/phase shifts, and digitally combines the signals. Each sub array (or phase centre) requires its own anti-alias filter and digitiser, which must be matched and sample timing synchronised over the signal chains for each phase centre. This results in a system of considerable complexity.

SUMMARY

The present invention provides, in a first aspect, a radar system for forming a scanning receive beam from signals received by a phased array having a plurality of sub arrays, the system comprising: a plurality of phase units each configured to receive a said signal from one or more sub arrays; wherein each phase unit comprises a waveform generator configured to generate an analogue waveform having a frequency corresponding to a time-varying phase shift; and wherein each waveform generator is arranged to digitally generate the analogue waveform, and each phase unit is configured to output a comparison of the received signal with the waveform, the output incorporating the time-varying phase shift, and the system further comprising a combining unit configured to combine the outputs from the plurality of phase units to form a scanning receive beam.

Thus, the present invention provides an improved radar system which can scan a receive beam rapidly and continuously.

DESCRIPTION OF THE DRAWINGS

The present invention will be described, by way of example only, with reference to the following drawings.

DETAILED DESCRIPTION

Figure 1:
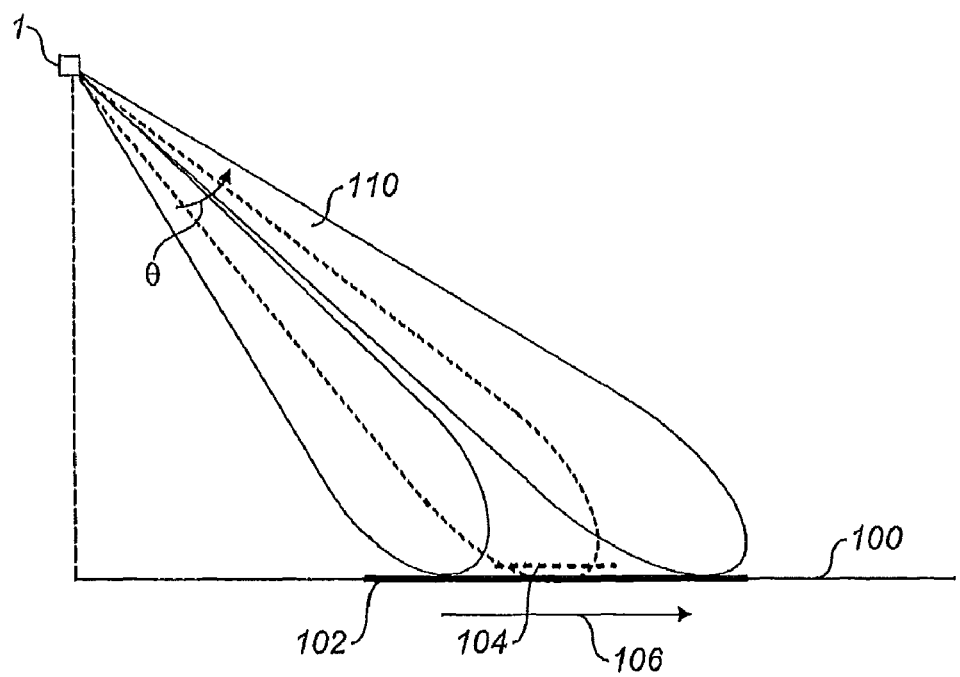
FIG. 1 is a schematic cross section of the scanned receive beam.

FIG. 1 shows a radar system 1 according to the present invention, configured to examine features on ground 100. Preferably, the radar system 1 is mounted in a platform moving relative to the ground 100, and in particular may be mounted in a satellite or aircraft. The radar system 1 preferably looks sideways, namely, perpendicular to the direction of movement of the radar system 1. The radar system 1 may be used as a synthetic aperture radar.

As shown in FIG. 1, the radar system 1 looks sideways and downwardly. The radar system 1 is travelling into (or out of) the page. The radar system 1 may include a transmit antenna which illuminates a swath 102 of ground with a series of radar pulses. The transmit antenna has a relatively wide beam. In order to receive the reflected echo from the swath 102, a receive beam of the radar system 1 scans across the swath 102. The receive beam is a relatively narrow beam, receiving echoes from relatively narrow area 104. The receive beam area 104 scans across swath 102, starting at a near part of swath 102 and ending at a far part of swath 102, moving as indicated by arrow 106. The scan of the receive beam across swath 102 is continuous, and is completed in the time interval between transmission pulses. The rate of movement of the receive beam substantially matches the rate at which the source of received echoes moves across the swath 102. The receive beam has a higher gain and faster roll off than a beam covering the entire swath width 102. In particular, the receive beam has a higher gain than the transmit beam. This results in improved instrument sensitivity and reduced range ambiguities. The receive beam area 104 may scan across the swath 102 in a period of between around 10 to 400 µs.

Figure 2:
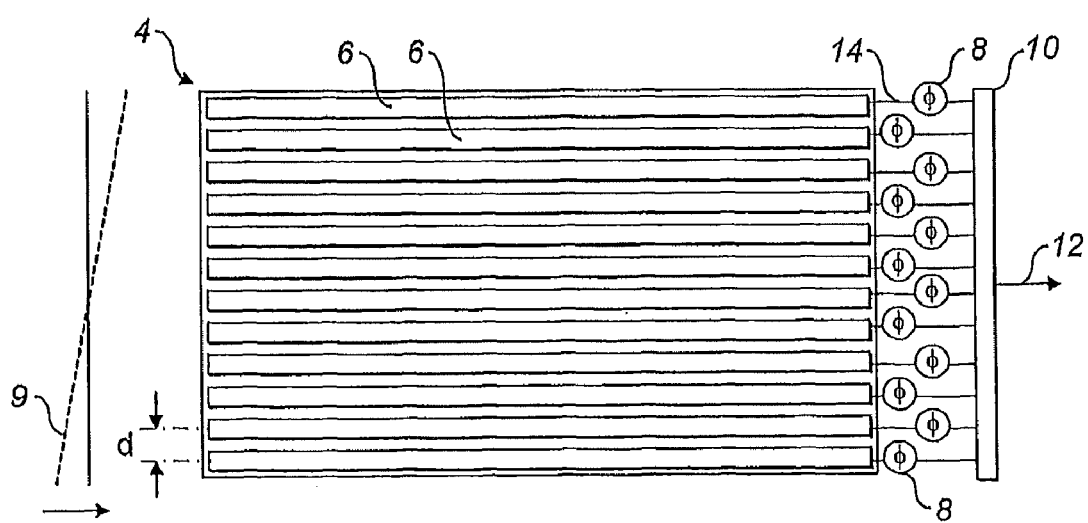
FIG. 2 is a schematic plan view of a phased array antenna forming part of the radar system of the present invention.

FIG. 2 shows a phased array 4 comprising a plurality of sub arrays 6, forming part of the radar system 1. The phased array 4 preferably comprises between 5 and 30 sub arrays 6. The sub arrays 6 receive the echo radar signal, and may optionally also transmit the radar transmission pulses. The sub arrays 6 are elongate elements arranged in rows. The sub arrays 6 have a longitudinal axis which is generally aligned with the direction of travel of the radar system 1. The front face of the array 4 shown faces sideways, and is preferably angled downwardly.

The radar system comprises a plurality of phase units 8. A phase unit 8 is connected to each sub array 6. The phase units 8 receive a signal 14 from each sub array 6. The phase units 8 form a receive beam having a controlled width and direction from the signals received by the sub arrays 6. The phase units 8 effectively introduce a phase shift into the signal received by each sub array. The phase shifts are controlled across the array 4 in a function. In particular, the phase shift introduced is a linear function of the position of the sub array 6 within the array 4, for example as illustrated by line 9. The phase units 8 therefore form a receive beam. The phase units 8 vary the phase shifts introduced with time, resulting in the receive beam scanning across an area with time. The phase units 8 can be considered as each selecting a part of the received signal having a particular phase difference from an adjacent phase unit 8, which varies with time. Further details of the phase units 8 are described below.

Received signals with beam scanning phase shifts are output by the phase unit 8, and combined by combining unit 10. The combining unit 10 produces an output signal 12. The output signal 12 is processed further, as will be described below.

The array 4 defines N phase centres with centre separation d. Each phase centre is generated by a single sub array 6. The receive beam can be scanned through a change of angle θ by applying phase shifts $ø_n$ to the N phase centres across the array 4. The phase shifts $ø_n$ follow:

$$ø_n = 2\pi n \sin(\theta) d/\lambda, \text{ where } \lambda \text{ is the wavelength at band centre, and } n \text{ is an integer.}$$

The beam is preferably scanned linearly with time. Thus, θ=kt, where k is a constant defining the beam scan rate.

$$ø_n = 2\pi n \sin(kt) d/\lambda,$$

$ø_n \approx 2\pi n k t d/\lambda$ for small scan angles. Generally, ø is less than 5°, and so the approximation of sin(kt)≈kt is valid.

Preferably, each sub array 6 is equally spaced and forms a phase centre introducing a different phase to an adjacent sub array 6. The difference in phase between adjacent sub arrays is the same across the array 4, being $ø_n 2\pi n k t d/\lambda$.

The phase shift $ø_n$ varies linearly with time, and so is equivalent to a small frequency shift of $f_n$=nkd/λ, termed the offset frequency. The radar system 1 utilises the offset frequency in order to scan the receive beam across the swath 102.

Figure 3:
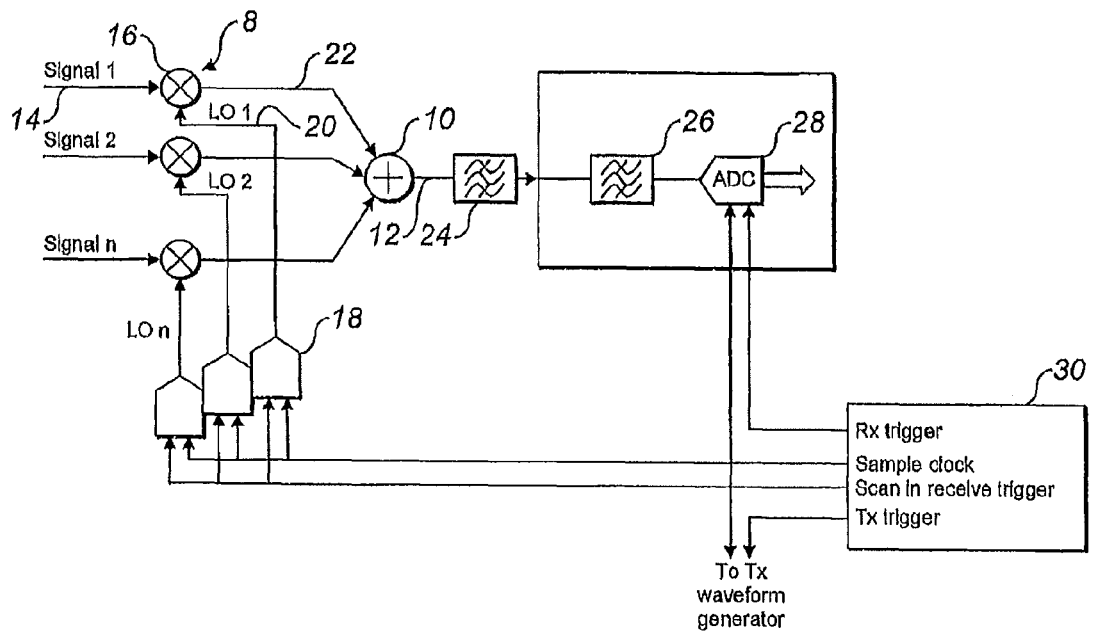
FIG. 3 is a diagram showing an implementation of the present invention.

FIG. 3 shows the apparatus for forming the receive beam using the offset frequency $f_n$. A plurality of signals 14 are received from the sub arrays 6, one signal per phase centre. A plurality of phase units 8 each comprises a mixer 16 and a local oscillator. Each signal 14 is fed into a first input of a mixer 16. A second input of each mixer 16 receives a local oscillator waveform. The local oscillator waveform is a digitally generated analogue waveform, preferably generated using Direct Digital Synthesis (DDS) in waveform generator 18. Direct Digital Synthesis is known, and a preferred embodiment of the DDS waveform generator 18 is described below.

The radar system 1 comprises a separate Direct Digital Synthesis generator 18 for each mixer 16, such that each mixer 16 is able to receive a unique frequency. A mixer 16 and a DDS generator 18 together form a phase unit 8, as mentioned in relation to FIG. 2.

The signal 14 from an antenna elevation phase centre is mixed in a mixer 16 with its own local oscillator frequency from generator 18 to a common nominal Intermediate Frequency.

An output 22 from each mixer 16 is combined in a combining unit 10, where the output signals 22 are summed. The combined signals 12 are passed to a mirror rejection filter 24. The mirror rejection filter 24 removes unwanted frequencies generated by the mixers 16. The common nominal Intermediate Frequency used is preferably the difference in frequency between the signal 14 and the generator 18. The required beam forming can be considered achieved at the output of the mirror rejection filter 24.

The output of the mirror rejection filter 24 is passed to a receiver. The receiver comprises an anti alias filter 26 and an analogue-to-digital converter (ADC) 28. The receive beam is digitised as a single channel. Only one anti alias filter 26 and ADC 28 is required, so no matching and synchronising is required.

Preferably, there is a separate mixer for each antenna elevation phase centre, generated by a sub array 6. Alternatively, since the scan angle required is small, adequate performance can be obtained by applying the required phase shifts to groups of phase centres, by coupling one mixer 16 to a group of a plurality of sub arrays 6. Each sub array 6 in a group would have the same phase shift applied. This reduces the number of mixers 16 required. As an example, 5 or 6 groups of sub arrays 6 forming phase centres may be adequate The function of the waveform generators using Direct Digital Synthesis (DDS) will now be outlined. The plurality of DDS generators 18 each generates a different frequency. DDS generators 18 coupled to adjacent sub arrays 6 generate frequencies which differ by a constant frequency, being the offset frequency $f_n$. Thus, any DDS generator 18 will produce a frequency which differs from a central phase centre frequency by an integer multiple of the smallest frequency offset $f_n$. The frequency generated by DDS generators 18 is preferably a linear function of the corresponding sub array position.

The Direct Digital Synthesis generators 18 produce a frequency $f_{Lo,n}$ which is offset from a base frequency $f_{LO}$ by an applied offset frequency required for beam sweeping. Thus, $f_{LO,n}=f_{LO}+p \cdot f_n$ (or $f_{LO,n}-p \cdot f_n$ if the local oscillator frequency produced is less than the signal frequency), where p, an integer, relates to the position of the phase centre relative to a central phase centre.

The frequency generated by each waveform generator 18 is a single frequency being the sum (or difference) of the base frequency $f_{LO}$ and the applied offset frequency $p \cdot f_n$. The base frequency $f_{LO}$ is common to each generator 18. The applied offset frequency is preferably unique to each generator 18, and so the frequency generated by each waveform generator 18 is unique. Each local oscillator phase must be reset at the start of the receive scan operation. The start phase is defined so that all local oscillators have the same phase at the centre of the beam scan, i.e. the point where the beam is pointing in its nominal boresight direction.

The local oscillator waveforms generated by DDS generators 18 are synchronised with each other and with the radar carrier. The local oscillator waveforms are finely separated and synchronised, which is advantageously achieved using DDS.

The phase units 8 can be considered to select a part of a spread of frequencies received by the sub arrays 6 which corresponds to a time-varying phase. The time-varying phase is provided by the offset frequency of the digitally controlled analogue waveform. The time-varying phase is incorporated by comparison of the waveform with the received signal, which is preferably carried out by the mixer in each phase unit 8. The output of the phase units 8 reflects the time-varying phase shift provided by the waveform generators 18.

Figure 4:
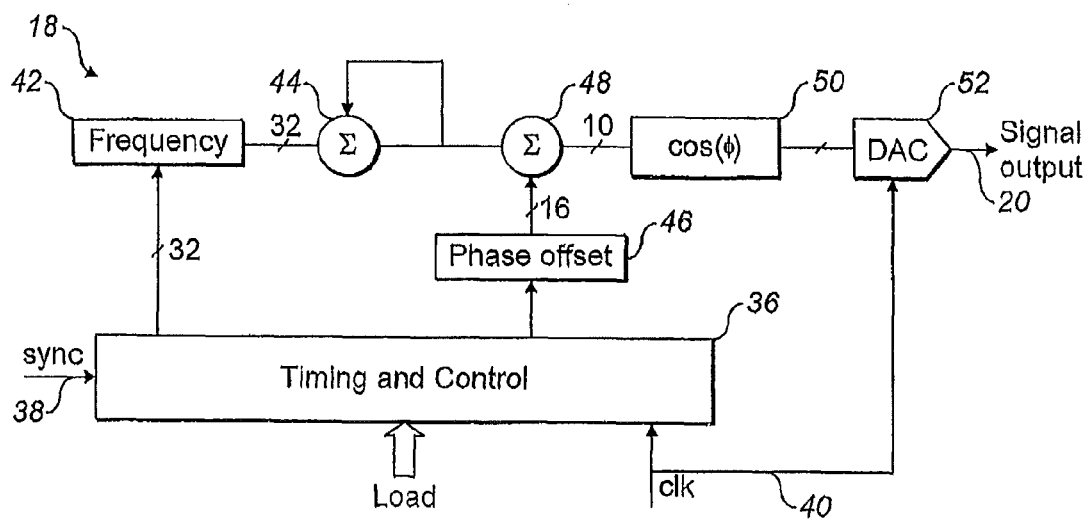
FIG. 4 is a diagram showing a Direct Digital Synthesis generator forming part of the present invention.

FIG. 4 shows a possible arrangement of a Direct Digital Synthesis (DDS) generator 18. The DDS generator 18 is substantially conventional, and has two main functions: a logic function to generate a sequence of digital representations of the required phase, and a digital-to-analogue converter (DAC) to convert the required phase to an analogue cosine signal. A timing and control unit 36 controls a frequency register 42 loaded with a number F. F represents the output frequency in cycles/sample×$2^n$. Preferably, n=32, such that $2^{32}$ represents 1 cycle/sample.

An adder 44 adds the frequency register contents F to a feed back output when clocked. An adder 48 adds a phase offset from phase offset register 46 to the accumulated phase at the output of adder 44. The phase offset register 46 is loaded with the required start phase $ø_0$, in cycles×$2^n$. The phase offset $ø_o$ is preferably stored as a 16 bit word. Preferably, the most significant bits from adder 48 are used as an address in a cosine look up table 50. The $2^{10}$ entries span one cycle of a cosine waveform. Carry bits from the adders can be ignored as they also represent one cycle.

The selected cosine value is passed to a digital-to-analogue (DAC) converter 52. The signal 20 output from the DAC 52 is fed into a corresponding mixer 16, as shown in FIG. 3.

The timing and control unit 36 generates a clock signal used by the DAC 52, and also by adders 44, 48. Timing and control unit 36 also generates a synchronisation signal 38 which causes phase accumulated at the output of adder 44 to be reset to "0", and reloads the frequency register 42 and phase offset register 46. The accumulated phase word received by look-up table 50 varies linearly with clock cycles, and so represents a single frequency tone.

A separate DDS generator is used for each local oscillator waveform required. Each DDS generator 18 is clocked with the same clock. Preferably, the clock is the radar receive clock, which is also used to clock the ADC 28 in FIG. 3. Each DDS generator 18 is reset with the same synchronisation pulse at the start of the beam scan.

The start of each local oscillator is therefore defined at the common synchronisation instant. Each DDS generator 18 is configured to produce a different frequency. In particular, each DDS generator 18 produces a frequency which differs by a fixed offset frequency $f_n$ from a DDS generator 18 coupled to an adjacent sub array 6 or group of sub arrays 6. This is achieved using a different value F in the frequency register 42 of each DDS generator 18. Additionally, the phase offset stored in register 46 may differ between DDS generators to determine the angle at which the receive beam is initially directed.

Typically, the DDS generators 18 use a 500 MHz clock and 32 bit frequency register, allowing output frequency to be varied in steps of 0.12 Hz. The plurality of DDS generators 18 provide a plurality of accurately controlled and closely spaced frequencies, with a well controlled phase difference between them. This allows fast and continuous scanning of the receive beam.

The DDS generators 18 can be implemented as conventionally known. For example they may be implemented in a dedicated chip. Alternatively, the digital phase generation can be implemented in a gate array, the digital phase values then being fed to a separate digital-to-analogue converter. In particular, the digital phase generators can be implemented in the same gate array as used for radar transmit signal synthesis and/or radar timing and control.

The analogue waveform generated by direct digital synthesis is preferably a cosine waveform (equivalent to a sine waveform with a phase shift).

In use, a series of radar pulses are generated by a transmission unit, which may form part of the radar system 1. The transmitted pulses are reflected by features across the area 102. A phased array receives the reflections, but from only a part of the area 102 at any one time. The receive beam, defined by the area 104 over which reflections are received, is scanned outwardly from a near side of the area 102 to a far side of the area 102. The waveform generators 18 are initially configured with starting phases to direct the receive beam to the near side of the area 102. The different frequencies of the waveform generators 18, generated using Direct Digital Synthesis, introduce time-varying phase shifts into the receive beam which cause the receive beam to scan with time. Prior to the subsequent transmission pulse, the receive beam ceases, and the waveform generators 18 are reset to start again directed at the near side of the area 104.

Due to large distances between the radar system 1 and the ground, there may be a delay between a transmission pulse being generated and the receive beam being scanned to receive the echoes. Further transmission pulses may be transmitted during that delay. Therefore, whilst the receive beam is preferably scanned between transmission pulses, it is not necessarily the case that echoes from the immediately preceding transmission pulse are being received.

The embodiment described above provides a scanning receive beam having a constant width, and which scans at a constant angular rate with time. Alternatively, the beam width and/or angular rate may be varied across the scan. The radar system 1 may be configured such that the receive beam width decreases as the beam moves towards a ground point further from the radar system 1. In addition or alternatively, the radar system 1 may be configured such that the angular rate decreases as the beam moves towards a ground point further from the radar system 1. The variation in beam width and/or angular rate provides for improved uniformity of the receive beam as it scans across the ground. In particular, the area from which echoes are received is more consistent, with the beam footprint, across the scan than the linear approximation used above.

In a further embodiment of the invention, the radar system 1 generates a receive beam with a scan angle which varies quadratically with time.

Scan angle $θ=kt+ct^2$ where $k$ and $c$ are constants defining the scan rate

Using the definition of phase shift $ø_n$ for each phase centre n above:

$ø_n 2πn \sin(kt+ct^2)d/λ$.

Thus, the offset frequency $f_n=n(k+2ct)d/λ$ for small angles

The frequency generated in each generator 18 linearly increases with time, in order to generate the receive beam with a scan angle which varies quadratically with time. The waveform is a linear FM ramp signal which can be generated using Direct Digital Synthesis, as is conventionally known. Phase units 8 having DDS generators 18 using the overall arrangement described above can be used in this embodiment.

The radar system 1 may generate a receive beam with a width which decreases linearly with time. This is achieved by modifying each of the DDS generators 18 by an additional phase weighting $δø_n$ which varies quadratically across the sub arrays 6. For an elevation phase centre n:

$δø_n=2πa(n-n_0)^2$ where $n_0$ is the central phase centre, and a is a constant For the beam to broaden linearly with time:

$δø_n(t)=2πa(n-n_0)^2(t-t_0)$ where $t_0$ is the time at which the beam is uniformly weighted.

When the beam is uniformly weighted, it will be at its narrowest. This is preferably when directed at the farthest part of the area to be scanned, i.e. at far swath.

The combination of the additional phase weighting $\delta\phi_n$ and a linear scanning phase provides:

$$\phi_n(t)=2\pi mktd/\lambda+2\pi a(n-n_0)^2(t-t_0) \text{ where } m \text{ is an integer}$$

$$\phi_n(t)=2\pi(mkd/\lambda+a(n-n_0)^2)t-2\pi a(n-n_0)^2 t_0$$

Thus:

$$f_n=mkd/\lambda+a(n-n_0)^2$$

The beam width can therefore be reduced linearly with time by modifying the offset frequency $f_n$ by a term $a(n-n_0)^2$, and modifying the initial phase of the local oscillator by a term $2\pi a(n-n_0)^2 t_0$.

Alternatively, the beam width and angular scanning rate can both be varied with time, by combining the appropriate phase weightings.

The radar system 1 has been described as generating a receive beam with a width which decreases as a linear function of time. Alternatively, the beam width may decrease or vary as a different function of time.

A radar system module may be formed using the radar system 1 of the present invention. The radar system module is arranged to be inserted into an existing radar system, without requiring substantive modification of the existing radar. The module comprises an embodiment of the radar system described above, and in addition, a frequency converter. The frequency converter is located after the mirror rejection filter 24. The frequency converter is arranged to increase the frequency from the common nominal Intermediate Frequency to a frequency substantially matching the signals received by the sub arrays and passed to the phase units. The frequency converter is preferably a mixer, using as a local oscillator the waveform generator 18 from the central phase centre. The frequency converter outputs a frequency similar to that received by the sub arrays 6, and this output can be fed into a conventional radar system instead of an input from the sub arrays. The beam forming carried out by the module is transparent to the conventional radar system, and does not affect further operation of the conventional radar system.

In a further embodiment, the present invention is a satellite including a radar system as described in any of the embodiments described above. The satellite preferably has the radar system mounted as a side-looking radar, and preferably to function as a synthetic aperture radar.

The antenna sub arrays 6 may be used to form both a receive antenna for receiving a signal and a transmit antenna for transmitting a signal. Alternatively, separate antennas may be used as a receive antenna and a transmit antenna. The separate receive antenna and transmit antenna may be located on the same platform, which is preferably a moving platform. Alternatively, the radar system may be a bistatic radar system in which the receive antenna is located on a different platform to the transmit antenna. The platform carrying the receive antenna and/or the platform carrying the transmit antenna may be moving.

The radar system 1 has been described as imaging a swath of ground. The radar system 1 may image any area of ground, in any direction. Alternatively, the radar system may be configured not to image the ground. The radar system may be arranged to scan a receive beam above the ground.

The invention claimed is:

1. A radar system for receiving reflected signals from a scanned area in a phased array having a plurality of sub arrays, the system comprising:
a plurality of phase units each configured to receive a signal from one or more sub arrays;
wherein each phase unit comprises a waveform generator configured to generate an analog waveform having frequency adjacent phase units generating frequencies which differ by an offset frequency; and
wherein each waveform generator is arranged to digitally generate the analog waveform, and
each phase unit is configured to output a comparison of the received signal with the analog waveform, the output incorporating the offset frequency, and
the system further comprising a combining unit configured to combine the outputs from the plurality of phase units to receive reflected signals from the scanned area.

2. The radar system as claimed in claim 1 wherein the waveform generator generates the digitally controlled analog waveform by Direct Digital Synthesis.

3. The radar system as claimed in claim 2 wherein the waveform generator using Direct Digital Synthesis comprises:
a logic function to generate a sequence of digital representations of a required phase; and
a digital-to-analog converter (DAC) to convert the required phase to the analog waveform.

4. The radar system as claimed in claim 1, wherein each of the plurality of phase units comprises:
a mixer for comparing the received signal with the analog waveform,
each mixer being configured to mix said signal from one or more sub arrays with the analog waveform.

5. The radar system as claimed in claim 1, wherein the waveform generators are synchronized, and each waveform has a unique frequency.

6. The radar system as claimed in claim 1, wherein the waveform generator in each phase unit digitally stores a starting phase of the waveform, such that the scanned area has a defined direction on starting scanning.

7. The radar system as claimed in claim 1, wherein the analog waveform has a frequency formed from a base frequency common to the waveform generators and the applied offset frequency.

8. The radar system as claimed in claim 1, configured to receive echoes of radar transmission pulses transmitted over an area,
wherein the reflected signals are focused on a part of the area,
and the radar system is configured to scan the reflected signals across the area at a rate substantially matching an echo of said a radar transmission pulses from across the area.

9. The radar system as claimed in claim 8, configured to scan the reflected signals across the area in a time less than a time between consecutive transmission pulses.

10. The radar system as claimed in claim 1, wherein the frequency of each analog waveform is varied during a scan such that the reflected signals are scanned at an angular rate which varies with time.

11. The radar system as claimed in claim 1, wherein the frequency of the analog waveform is varied during a scan such that the scanned area width varies with time.

12. The radar system as claimed in claim 1, wherein the frequency of the analog waveform is constant during a scan such that the scanned area is scanned at a constant angular rate and with a constant width.

13. The radar system as claimed in claim 1, wherein each of the plurality of phase units is configured to receive a signal from a single sub array, or from a group of sub arrays.

14. The radar system as claimed in claim 1, configured to be mounted in at least one moving platform and scan the reflected signals in a sideways direction perpendicular to a direction of travel of the platform.

15. A radar system module for insertion in an existing radar system, the module comprising:
a plurality of phase units each configured to receive a signal from one or more sub arrays;
wherein each phase unit comprises a waveform generator configured to generate an analog waveform having a frequency wherein adjacent phase units generate frequencies which differ by an offset frequency; and
wherein each waveform generator is arranged to digitally generate the analog waveform, and
each phase unit is configured to output a comparison of the received signal with the analog waveform, the output incorporating the offset frequency, and
the system further comprising a combining unit configured to combine the outputs from the plurality of phase units to receive reflected signals from a scanned area at an output frequency; and
a frequency converter arranged to convert the output frequency from the combining unit to substantially a same frequency as the signals received by the sub arrays.

16. The radar system as claimed in claim 15, wherein the waveform generators are synchronized, and each waveform has a unique frequency.

17. The radar system as claimed in claim 16, wherein the waveform generator in each phase unit digitally stores a starting phase of the waveform, such that the scanned area has a defined direction on starting scanning.

18. The radar system as claimed in claim 17, wherein the analog waveform has a frequency formed from a base frequency common to the waveform generators and the applied offset frequency.

19. The radar system as claimed in claim 18, configured to receive echoes of radar transmission pulses transmitted over an area,
wherein the reflected signals are focused on a part of the area,
and the radar system is configured to scan the reflected signals across the area at a rate substantially matching an echo of said a radar transmission pulses from across the area.

20. The radar system as claimed in claim 19, wherein the frequency of each analog waveform is varied during a scan such that the is reflected signals are scanned at an angular rate which varies with time.

\* \* \* \* \*